Jan. 18, 1938.  H. RUMSEY, JR  2,106,038
MEASURING APPARATUS
Filed May 20, 1937   2 Sheets-Sheet 1

WITNESSES

INVENTOR
Herbert Rumsey Jr.
BY
Munn Anderson & Liddy
ATTORNEYS

Jan. 18, 1938.  H. RUMSEY, JR  2,106,038
MEASURING APPARATUS
Filed May 20, 1937  2 Sheets-Sheet 2

INVENTOR
Herbert Rumsey Jr.
BY
Munn Anderson & Liddy
ATTORNEYS

Patented Jan. 18, 1938

2,106,038

UNITED STATES PATENT OFFICE 2,106,038

MEASURING APPARATUS

Herbert Rumsey, Jr., Nutley, N. J.

Application May 20, 1937, Serial No. 143,651

8 Claims. (Cl. 99—256)

This invention relates to improvements in measuring apparatus and particularly to compensating fluid meters.

It is an object of this invention to provide an improved compensating meter which will automatically measure and indicate the amount of fluid actually consumed or utilized for a given purpose and to deduct or compensate for the fluid which has been wasted or which for one reason or another was not used after it passed through the meter.

In the artery method of curing meats such as hams, shoulders, beef tongues and the like, which has recently become popular, the meat is cured by injecting the brine into the meat through the arteries so that an even distribution of the brine is immediately obtained and the action of the brine on the meat starts at once, thus reducing the time required by the old method and at the same time making the meat more tender. The chief difficulty with this method lies in the inability of the operator to inject a uniform amount of brine in each piece of meat, due principally to the fact that a large but variable portion of the brine is not retained in the meat but escapes through cuts or breaks in the arteries and veins where the meat has been severed from the carcass. Uniformity as to brine content is very essential as an excess causes the finished product to be soft and over-moist and may also result in violating the rules laid down by the Bureau of Animal Industry having to do with limitations on moisture contents, while insufficient amounts do not produce a properly cured piece of meat. Due to the fact that varying amounts of the brine escape from the meat, ordinary meters have been ineffectual in measuring the amount of brine retained in the meat. Attempts have been made to inject predetermined amounts of brine into the pieces of meat by placing the meat on a scale while the brine is being injected but this method is not practical because of variations in the pressure applied to the scale by the hand of the operator and also due to variations in the weight of the brine valve while the brine is being injected.

It is an object of the invention to overcome the difficulties as outlined above and to produce an improved compensating fluid meter for measuring and indicating the amount of brine or other curing fluid actually retained in the meat and for enabling the operator to inject into the meat the desired uniform amount of fluid.

My invention contemplates the use of a meter for measuring the total amount of fluid injected into the artery and also another meter for measuring the amount of fluid which escapes from the meat. An indicator is provided whereby the reading of the second meter is deducted from the reading of the first meter so that the actual amount of fluid retained in the meat is registered on the indicator.

For a fuller understanding of the invention reference should be had to the accompanying drawings, in which—

Figure 1:
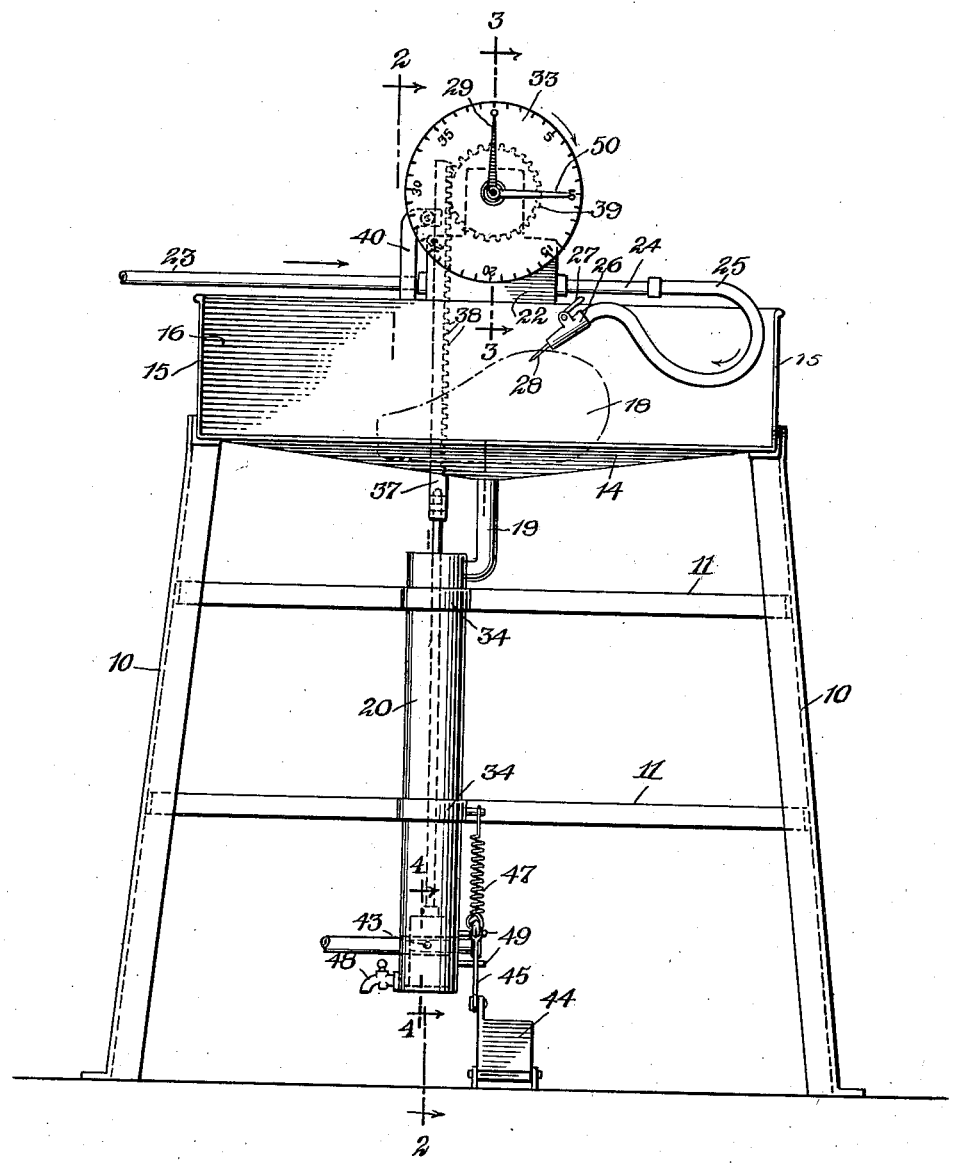
Fig. 1 shows an end elevation of a device embodying my invention.
Figure 4:
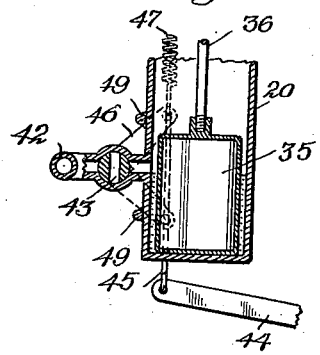
Fig. 4 is a sectional view in the direction of the arrows on the line 4—4 of Fig. 1 showing the lower end of the overflow receptacle and the float for operating the compensating mechanism.
Figure 3:
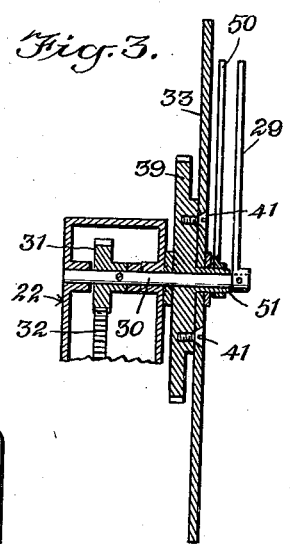
Fig. 3 is a sectional view in the direction of the arrows on the line 3—3 of Fig. 1, showing the arrangement of the dial face and the dial hands.
Figure 2:
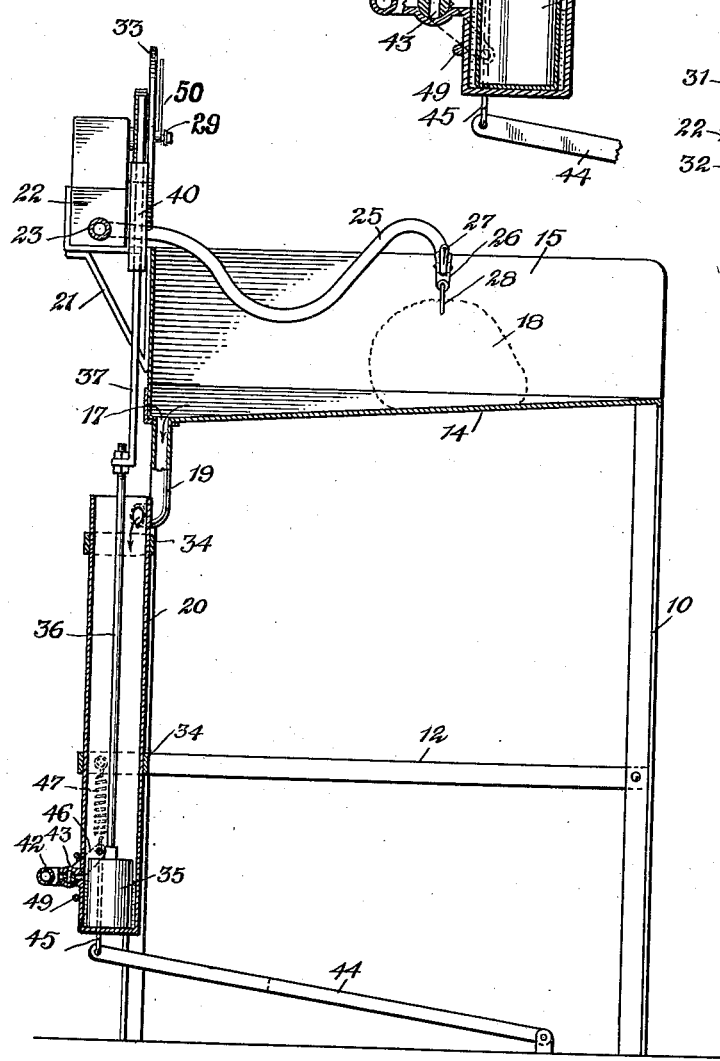
Fig. 2 is a longitudinal sectional view in the direction of the arrows on the line 2—2 in Fig. 1.

My apparatus is preferably mounted on a table of convenient height consisting of uprights 10, braces 11 and 12 connected between the uprights, and table top 14 formed with longitudinal side walls 15 and back wall 16, the forward edge of the table top being open for the convenience of the operator.

In using my device the meat which is being cured is placed upon the table top 14 as indicated in dotted lines at 18, and the operator stands adjacent the open end of the table injecting the brine solution into the arteries of the meat in the usual manner. The table top with its surrounding walls 15 and 16 serves as a receptacle to receive the brine which passes out of the meat through the cuts in the arteries and veins, and it is preferably graded or pitched as indicated towards the outlet 17 through which the escaping brine flows into pipe or duct 19 and thence into the elongated receptacle 20.

Mounted on a bracket 21 secured to the rear wall 16 of the table is a fluid meter 22 of conventional construction having an inlet duct 23 leading from the source of supply of the brine or other curing solution to the meter. Leading out of the meter is an outlet duct or pipe 24 connected by means of flexible tubing 25 to a valve 26 having a control handle 27, the valve in turn being connected to a hollow needle 28 of the usual type through which the brine is injected into the arteries of the meat.

The meter, as stated above, is of conventional construction and is arranged to measure the amount of fluid passing through the meter into the meat. To indicate the amount of fluid thus measured I provide a pointer or dial hand 29 mounted upon a shaft 30 which is connected by suitable gears 31 and 32 to the operating mechanism of the meter. The shaft 30 passes through the center of dial face 33 and may move relative thereto and adjacent the periphery of the dial face are suitable markings for indicating the amount either in weight or volume of brine or other fluid passing through the meter. Thus in the accompanying drawings the markings "5", "10", etc., are intended to indicate ounces, and when fluid is fed through the meter the pointer or dial hand 29 will rotate relative to the dial face so as to point to a number indicating the number of ounces which have passed through the meter.

When my apparatus is used in curing ham or other meat, the operator places the piece of meat in the position indicated in dotted lines at 18 in the drawings and injects the needle 28 into one of the severed open ends of an artery. The handle 27 is then turned so as to open valve 26 and permit the brine or other curing fluid to flow into the meat. The meter 22 will then operate to cause the pointer 29 to rotate to the normal position of the number on the dial face corresponding to the number of ounces of fluid passing through the meter. Thus if ten ounces pass through the meter the pointer 29 will be caused to rotate through an arc of 90 degrees and point to the normal position of numeral 10 on the dial face. However, it should be remembered that a large portion of the brine after it is injected into the arteries of the meat escapes from the cut or severed arteries and veins, and therefore the position of pointer 29 does not accurately indicate the number of ounces which are actually retained by the meat. To meet this situation I provide compensating mechanism for measuring the amount of fluid escaping from the meat and for deducting this amount from the actual reading of the pointer.

Thus, the brine which escapes from the meat, as pointed out above, due to the pitch or grade of the table top 14 flows outwardly through outlet 17 and pipe 19 into the elongated receptacle 20 mounted in brackets 34 formed in the braces 11. Inside the receptacle is positioned a float 35 which is of such a size and shape that it may shift vertically in the receptacle, and of such a weight that the float together with the indicating and operating mechanism which will be hereinafter described will float on or be supported by the brine or other curing fluid.

The float is connected by means of rod or shaft 36 to a rack 37 formed with teeth 38 as most clearly shown in dotted lines in Fig. 1, which engage with the teeth of sprocket or gear 39. The teeth of rack 37 are held in engagement with the teeth of gear 39 by means of a guide 40 and the gear 39 is suitably secured to the dial face 33 by means of screws 41. Due to this arrangement, when the float 35 is shifted in a vertical direction the dial face 33 will be caused to rotate. The receptacle 20 and the gear 39 are so proportioned that the dial face 33 is caused to rotate an amount proportionate to the number of ounces of brine collected in the receptacle 20. Thus, if ten ounces are collected in the receptacle 20, the dial face 33 will be caused to rotate through an arc equivalent to the ten ounce markings on the dial face, that is, an arc of 90 degrees.

In the receptacle 20 at a point just below the level at which float 35 is caused to float, I provide an outlet 42 controlled by a valve 43. The valve is arranged so as to be conveniently operated by a foot pedal 44 which is connected by link 45 to lever 46 which in turn is connected to and operates the valve. The valve is normally held in closed position by means of tension spring 47 and upon the depression of pedal 44 it is caused to open thereby draining the receptacle 20 through outlet 42. Stops 49 engage the lever 46 at the closed and open positions of valve 43 as indicated. After the receptacle has been drained in this fashion, sufficient brine remains in the receptacle so that any slight addition will cause the member 35 to float and shift upwardly in a vertical direction.

It is desirable from time to time to completely drain the receptacle and accordingly I provide a petcock or faucet 48 of conventional design at the bottom thereof.

From the foregoing description of the mechanism it will be seen that two separate measuring devices are employed; the first is the meter 22 and the second is receptacle 20 and its associated mechanism. The meter indicates through the medium of pointer 29 the total amount of fluid passing therethrough whereas the float 35 deducts from the meter reading the amount of fluid which has passed outwardly from the ham or other meat being cured, thereby causing the pointer to indicate on the dial face the actual amount of fluid remaining in the ham.

To facilitate the use of the mechanism I prefer to provide an auxiliary pointer 50 which is frictionally mounted on a tubular projection 51 formed integral with gear 39. The pointer 50 may be manually shifted relative to dial face 33 and gear 39, but when shifted to a given position will be frictionally held at that position. Where the amount of brine to be injected in the meat has been determined by the operator, he can shift the pointer 50 to the number corresponding to the desired amount. Then when pointer 29 registers with pointer 50 he knows that the desired amount has been injected in the meat.

In using my apparatus the operator first determines the amount of fluid which is to be injected into the meat. This is usually determined in accordance with a certain percentage of the weight of the meat. For the purpose of our illustration let us assume that 10 ounces of the curing fluid are to be injected in the meat. The pointer 50 is then shifted so as to point to the numeral 10 on dial face 33 and the piece of meat is placed upon the table top 14 in the approximate position shown in dotted lines in the drawings. The needle 28 is injected into the open end of an artery and handle 27 is turned so as to permit the flow of brine through the valve and needle into the meat. As soon as the fluid begins to flow it will cause the operation of meter 22 which in turn causes pointer 29 to shift in proportion to the amount of fluid passing therethrough. When 10 ounces have passed through the meter the hand 29 passes through an arc of 90 degrees and would then point to the numeral 10 on the dial face 33 if it were not for the compensating mechanism. It must be remembered, however, that in the meantime some of the fluid has escaped from the meat and has flowed down through pipe 19 into the receptacle 20 causing float 35 to shift upwardly and through the interengagement of rack 37 and gear 39 has caused dial face 33 to move in a clockwise direction as indicated by the arrow to a degree corresponding to the amount of fluid collected in the receptacle 20. Thus if five of the ten ounces which have passed through meter 22 have escaped from the meat and been collected in the receptacle 20, dial face 33 will be caused to rotate through an arc of 45 degrees causing the ultimate reading of pointer 29 on the dial face to be "5" thus accurately indicating the amount of brine remaining in the meat. The operator continues injecting the brine into the meat until hand 29 points to the numeral "10" on the dial face. A short time is required for the escaping brine to drain into the receptacle and operate the float and the operator should pause momentarily to permit substantially complete drainage. Since the pointer 50 has been set at "10" on the dial face, the operator continues until pointer 29 registers with pointer 50.

When the desired amount of brine has thus been injected into the meat being cured, the valve handle 27 is closed and needle 28 is withdrawn from the artery. The operator then steps on pedal 44 opening valve 43, thus permitting the brine to escape from receptacle 20. Due to the position of outlet 42 it will be noted, however, that sufficient brine remains in receptacle 20 to cause float 35 immediately to float and shift upwardly when any additional brine is added to the receptacle. The operator can then continue with the curing of additional pieces of meat in the manner just described.

While the float 35, shaft 36, and rack 37 are sufficiently light so that the brine will cause them to shift upwardly thereby rotating dial face 33 in a clockwise direction, they should be of sufficient mass to cause them to automatically shift downwardly under the influence of gravity when the brine is withdrawn through outlet 42 and thereby return dial face 33 in a counter clockwise direction to its initial position.

If desired, the pointer may be returned to its initial position by manually rotating it after each operation.

From the foregoing description it will be appreciated that I have provided an improved measuring apparatus which is particularly adapted for use in curing meats by the artery curing method and which accurately registers the amount of fluid retained by the meat being cured. It will also be appreciated that by means of my apparatus the operator is enabled to inject the desired uniform amount of fluid into the meat being cured.

It should be understood that many modifications may be made in the illustrated and described embodiment of my invention without departing from the invention as set forth in the accompanying claims. Thus the pointer 50 may be eliminated entirely if desired, and also the mechanical connections between the various parts may be modified. Also it should be understood that while my apparatus is particularly suited for use in the artery process of curing meats, it may also be employed in other associations.

I claim:

1. A liquid measuring apparatus comprising a table provided with a top having a liquid drain therein, a liquid duct leading to the table top, a meter for measuring the amount of liquid passing through the duct, a dial hand connected to the meter so as to rotate in proportion to the amount of liquid measured thereby, a liquid receptacle connected to the drain in the table top so as to receive and retain liquid flowing through the drain, a float positioned in the receptacle, a drain for the receptacle controlled by a valve and positioned adjacent the initial floating level of the float, and a dial face operatively connected to the float so as to rotate through an arc proportionate to the amount of liquid in the receptacle, said dial hand and dial face being positioned in proximate relation and the dial face being provided with indicia so that the hand indicates on the dial face the difference between the liquid measured by the meter and the liquid retained in the receptacle.

2. An apparatus for curing meat by the artery curing method, comprising means for injecting a curing liquid into the artery of a piece of meat, means for measuring the amount of liquid thus injected, means for measuring the amount of liquid escaping from the meat, and indicating means operatively connected to the two measuring means for indicating the difference between the amount of liquid injected into the meat and the amount of liquid escaping from the meat.

3. An apparatus for curing meat by the artery curing method, comprising means for injecting a curing liquid into the artery of a piece of meat, a measuring device for measuring the amount of liquid thus injected, a shiftable indicator connected to the measuring device so as to be shifted in proportion to the amount of liquid measured thereby, a measuring device for measuring the amount of liquid escaping from the meat, and a shiftable indicator connected to the last mentioned measuring device so as to shift in proportion to the amount of liquid measured thereby, the two shiftable indicators being disposed in proximate relation so that the shifting of one relative to the other indicates the amount of liquid retained in the meat.

4. An apparatus for curing meat by the artery curing method, comprising means for injecting a curing liquid into the artery of a piece of meat, a meter for measuring the amount of liquid thus injected, a rotatable indicator hand operatively connected to the meter so as to shift in proportion to the amount of liquid measured thereby, a receptacle for receiving and retaining the liquid escaping from the meat, a float positioned in the receptacle, and a rotatable indicator face operatively connected to the float so as to be shiftable through an arc proportionate to the amount of liquid in the receptacle, the indicator hand and indicator face being positioned in proximate relation and the indicator face being provided with indicia so that the indicator hand indicates on the indicator face the amount of liquid retained in the meat.

5. An apparatus for curing meat by the artery curing method, comprising means for injecting a curing liquid into the artery of a piece of meat, a meter for measuring the amount of liquid thus injected, a rotatable indicator hand operatively connected to the meter so as to shift in proportion to the amount of liquid measured thereby, a receptacle for receiving and retaining the liquid escaping from the meat, a float positioned in the receptacle, a drain for the receptacle positioned at the initial floating level of the float and provided with a control valve, and a rotatable indicator face operatively connected to the float so as to be shiftable through an arc proportionate to the amount of liquid in the receptacle, the indicator hand and indicator face being positioned in proximate relation and the indicator face being provided with indicia so that the indicator hand indicates on the indicator face the amount of liquid retained in the meat.

6. Apparatus for curing meat by the artery curing method, comprising means for injecting a curing liquid into the artery of a piece of meat, a measuring device for measuring the amount of liquid thus injected, a shiftable member connected to the measuring device so as to be shifted in proportion to the amount of liquid measured thereby, means for accumulating and retaining the liquid escaping from the meat, a float operated by the liquid thus accumulated and retained, and a second shiftable member operated by the float, the two shiftable members being positioned in proximate relation so that shifting of one relative to the other indicates the amount of liquid retained in the meat.

7. Apparatus for curing meat by the artery curing method, comprising means for injecting a curing liquid into the artery of a piece of meat, measuring means for measuring the amount of liquid thus injected, means for accumulating and retaining the liquid escaping from the meat, a float operated by the liquid thus accumulated, and indicating means operated by the measuring means and float for indicating the difference between the amount of liquid injected into the meat and the amount of liquid escaping from the meat.

8. Apparatus for curing meat by the artery curing method, comprising a drain pan with shielding side walls for receiving the meat to be cured, means for injecting the curing liquid into the artery of the meat to be cured, measuring means for measuring the amount of liquid thus injected, a receptacle having connection with the drain pan for receiving and accumulating the liquid escaping from the meat, means operating in response to the liquid thus accumulated, and indicating means operating in response to the last-named means and the measuring means, for indicating the difference between the quantity of liquid injected in the meat and the quantity of liquid escaping therefrom.

HERBERT RUMSEY, Jr.